(12) United States Patent
Haavikko et al.

(10) Patent No.: US 11,358,679 B2
(45) Date of Patent: Jun. 14, 2022

(54) SNOWMOBILE WITH AN ELECTRIC MOTOR, AND A MANUFACTURING METHOD FOR A SNOWMOBILE WITH AN ELECTRIC MOTOR

(71) Applicant: Aurora Powertrains Oy, Rovaniemi (FI)

(72) Inventors: Olli Haavikko, Rovaniemi (FI); Jori-Jaakko Niskanen, Rovaniemi (FI); Matti Autioniemi, Rovaniemi (FI); Ari Karjalainen, Saarenkylä (FI); Juha Maunula, Rovaniemi (FI)

(73) Assignee: Aurora Powertrains Oy, Rovaniemi (FI)

( * ) Notice: Subject to any disclaimer, the term of this patent is extended or adjusted under 35 U.S.C. 154(b) by 172 days.

(21) Appl. No.: 16/615,846

(22) PCT Filed: May 17, 2018

(86) PCT No.: PCT/FI2018/050367
§ 371 (c)(1),
(2) Date: Nov. 22, 2019

(87) PCT Pub. No.: WO2018/215693
PCT Pub. Date: Nov. 29, 2018

(65) Prior Publication Data
US 2020/0140037 A1    May 7, 2020

(30) Foreign Application Priority Data

May 24, 2017    (FI) .................................... 20175471

(51) Int. Cl.
*B62M 27/02*    (2006.01)
*B62D 55/07*    (2006.01)

(52) U.S. Cl.
CPC ............. *B62M 27/02* (2013.01); *B62D 55/07* (2013.01); *B60Y 2200/252* (2013.01); *B62M 2027/023* (2013.01)

(58) Field of Classification Search
CPC . B62M 27/02; B62M 2027/023; B62D 55/07; B60Y 2200/252
See application file for complete search history.

(56) References Cited

U.S. PATENT DOCUMENTS 3,776,354 A * 12/1973 Duclo .................... B62M 27/02
180/296
4,069,882 A *  1/1978 Leonard ................. B62M 27/02
180/190

(Continued)

FOREIGN PATENT DOCUMENTS

GB          2390837 B     1/2006
JP       2007182137 A  *  7/2007

(Continued)

OTHER PUBLICATIONS

Anonymous: "McGill University Electric Snowmobile Team—Snowmobile—Design", Jan. 1, 2003, XP055499084, Retrieved from the Internet: URL: https://electricsnowmobile.mcgill.ca/English/design.htm [retrieved on Aug. 10, 2018] & Anonymous: "McGill University Electric Snowmobile Team—Snowmobile—Specifications", Jan. 1, 2003, XP055499085, Retrieved from the Internet: URL: https://electricsnowmobile.mcgill.ca/English/specifications.htm.

(Continued)

*Primary Examiner* — Jacob D Knutson
(74) *Attorney, Agent, or Firm* — Merchant & Gould P.C.

(57) ABSTRACT

The present invention introduces an electrically driven snowmobile, i.e. an electric sled. The electric motor is applied along the primary driving axis so that its rotational force is applied directly or indirectly to the primary driving (Continued)

axis. The electric motor may locate either inside or outside the frame structure of the snowmobile, and either on the left-hand side or the right-hand side of the primary driving axis. One option of manufacturing the electrically driven snowmobile is to convert a traditional combustion engine driven snowmobile into an electrical one by removing some parts and adding the electric motor within the snowmobile. Another option of manufacturing the electrically driven snowmobile is to build a transmission chain from scratch, and by adding an electric motor along the primary driving axis.

12 Claims, 7 Drawing Sheets

(56) References Cited

U.S. PATENT DOCUMENTS

| | | | | |
|---|---|---|---|---|
| 5,607,026 | A | * | 3/1997 | Rioux .................... B62M 27/02 |
| | | | | 180/190 |
| 5,685,387 | A | * | 11/1997 | Rioux .................... B62M 27/02 |
| | | | | 180/190 |
| 7,353,898 | B1 | * | 4/2008 | Bates, Jr. ............. B60K 5/1208 |
| | | | | 180/184 |
| 8,012,050 | B2 | | 9/2011 | Aitcin et al. |
| 9,505,450 | B1 | | 11/2016 | Girouard et al. |
| 2004/0112657 | A1 | * | 6/2004 | Ajiro .................... B60K 7/0007 |
| | | | | 180/65.51 |
| 2004/0154851 | A1 | * | 8/2004 | Massicotte ........... B60K 5/1208 |
| | | | | 180/190 |

FOREIGN PATENT DOCUMENTS

| | | | |
|---|---|---|---|
| JP | 2007182137 A | | 7/2007 |
| JP | 2014234096 A | * | 12/2014 |

OTHER PUBLICATIONS

Anonymous: "McGlll University Electric Snowmobile Team—snowmobile—Design", Jan. 1, 2003, XP055499084, Retrieved from the Internet: URL: https://electricsnowmobile.mcgill.ca/English/design.htm [retrieved on Aug. 10, 2018] & Anonymous: "McGill University Electric Snowmobile Team—Snowmobile—Specifications", Jan. 1, 2003, XP055499085, Retrieved from the Internet: URL: https://electricsnowmobile.mcgill.ca/English/specifications.htm, [retrieved on Aug. 10, 2018].

Anonymous: "Der Motorschlitten wird grün. Die Revolution der Betriebskosten beginnt, rein elektrisch", Jan. 1, 2015, XP055499086, Retrieved from the Internet: URL: https://icatpro.com/wp-content/uploads/2015/11/icat-13-ze-web.pdf [retrieved on Aug. 10, 2018].

* cited by examiner

SNOWMOBILE WITH AN ELECTRIC MOTOR, AND A MANUFACTURING METHOD FOR A SNOWMOBILE WITH AN ELECTRIC MOTOR

PRIORITY

This application is a U.S. national application of the international application number PCT/FI2018/050367 filed on May 17, 2018, which claims priority of Finnish application FI20175471 filed on May 24, 2017, the contents of all of which are incorporated herein by reference.

FIELD OF THE INVENTION

The present invention discloses snowmobiles, snowscooters or sleds which have an electric motor as a power source.

BACKGROUND OF THE INVENTION

Snowmobiles have traditionally used internal combustion engines for creating the moving energy for an endless drive track which makes the contact to the snowy ground. Internal combustion engines have various disadvantages which comprise the pollution (exhaust fumes) emerged from the exhaust pipe of the snowmobile, and the noise levels which easily tamper the ambient silence normally present in their usage environment, such as in wilderness or remote forests or near the holiday resorts or ski resorts. Furthermore, the consumption of non-renewable resources, as fossil fuels, is a general deficiency regarding all kinds of internal combustion engines.

The idea of electric motors is of course an old one concerning cars and other vehicles especially in a short driving ranges in towns and cities, but it has had a lot of problems regarding usability and the high prices of the vehicles, and also a low usage span (available driving kilometers before a need for recharge batteries) has been a big problem in wider applicability of the electric motors in cars.

Figure 1:
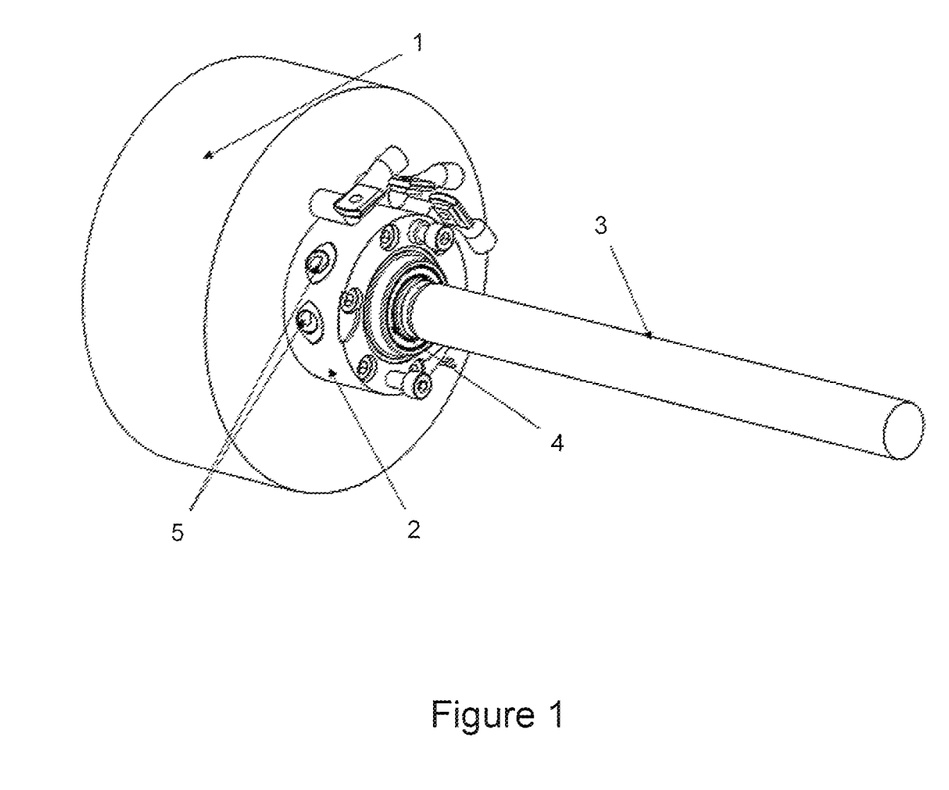
FIG. 1 illustrates a close-up of an electric motor located in another end of a shaft.

A traditional snowmobile has been discussed e.g. in U.S. Pat. No. 8,012,050 ("Bombardier 1"). According to this publication, the snowmobile comprises a frame, which has a drive track assembly placed underneath the frame, where the drive track assembly supports mainly the rear end of the snowmobile frame. Also below the frame are a pair of skis which are connected to a front suspension which in turn is connected to the forward end of the frame. FIG. 1 of Bombardier 1 shows the general geometry of different parts and functional elements of a snowmobile.

An engine, which is an internal combustion engine, is mounted on a frame, and usually it locates slightly behind the front suspension, roughly below the steering handles, so that it is protected e.g. by the frame structure itself or by a separate cover structure. The output kinetic (rotational) energy is transferred from the engine into a sheave or sheaves, which forms a driving pulley to a drive belt. In another end of the driving belt there is a driven pulley. In the central axis of the driven pulley, there is fixed another end of a jackshaft. The jackshaft is connected to a transmission system, which in this case is embodied as a fixed ratio reduction drive. Finally, the output of the transmission system is fed to the drive axle which has a connection to the drive track, rotating the endless drive track in order to create the forward motion for the snowmobile through its contact with the snow surface. Typically the driving pulley comprises also a coupling to couple kinetic energy of the engine to the driving pulley. The driving and driven pulley together implement a continuously variable transmission (CVT) for the snowmobile. As the CVT system comprises several parts (also inside both pulleys), it is quite expensive and it requires regular service as well.

Figure 2:
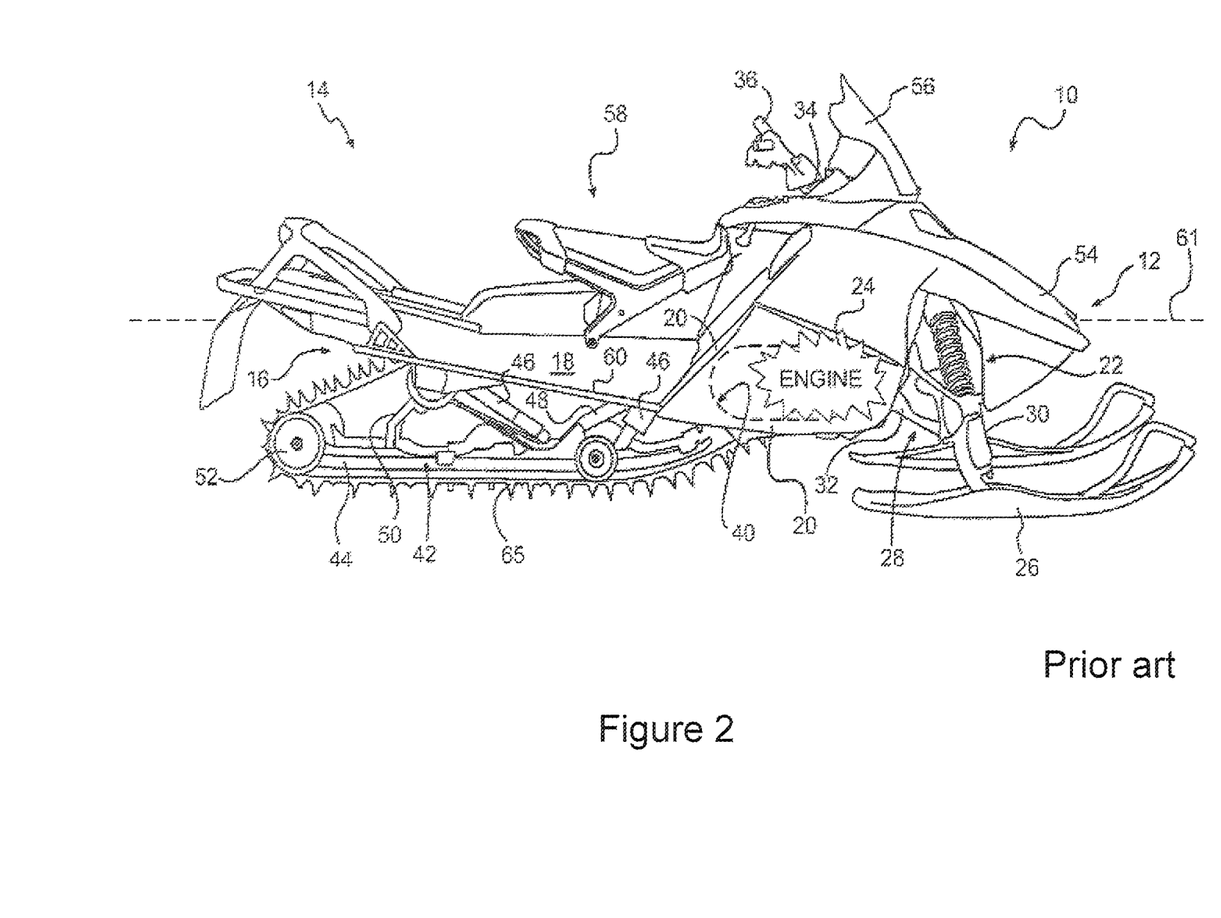
FIG. 2 illustrates a general geometry of a snowmobile according to prior art.

U.S. Pat. No. 9,505,450 ("Bombardier 2") discloses a snowmobile with an internal combustion engine but also an electric motor or a hybrid solution is mentioned as one option for the power supply of the snowmobile. FIGS. 17 and 18 show an electric motor as element "914". The jackshaft is element "26" and there is a circular rim "906" which is part of the rotor assembly rotated by the electric motor. The electric motor locates along a centre axis of the rim while the rim connects to the outer edge of the jackshaft. Still, chain connection, belt connection and/or a gear structure are mentioned as alternative ways of connecting the electric motor to the shaft 916. FIG. 2 of Bombardier 2 shows the general geometry of different parts and functional elements of a snowmobile, similarly as the corresponding illustration in Bombardier 1.

Electric motors as such have been used in connection with snowmobiles so that an electric motor has been placed to rotate the drive axle in the lower part of the snowmobile. This kind of solution requires large changes into the configuration of the transmission system of the present traditional snowmobiles, comprising removal of a chain housing, adding space for a large electric motor within the snowmobile frame structure and also the ground clearance will diminish because the electric motor would locate in a very low position in the snowmobile. This is not a very good solution for a practical electric snowmobile.

The background art has the general disadvantages of the internal combustion engine type of vehicles which have been discussed already in the above.

SUMMARY OF THE INVENTION

According to a first aspect of the invention, the present invention discloses a snowmobile with an electric motor, which snowmobile comprises a primary driving axis, a gear mechanism between the primary driving axis and a drive axle, where the drive axle is configured to rotate an endless drive track enabling movement of the snowmobile.

The invention is characterized in that the snowmobile further comprises an electric motor, whose rotating force is configured to apply directly or indirectly the primary driving axis.

In an embodiment of the invention, the snowmobile further comprises the electric motor located in the right-hand side of the snowmobile outside the frame structure so that the connection of the rotation axis of the electric motor to the primary driving axis passes through a right side hole on the frame structure.

In an embodiment of the invention, the snowmobile further comprises the electric motor located in the left-hand side of the snowmobile outside the frame structure so that the connection of the rotation axis of the electric motor to the primary driving axis passes through a left side hole on the frame structure.

In an embodiment of the invention, the snowmobile further comprises the electric motor located in the right-hand side of the snowmobile inside the frame structure so that the electric motor locates between a right end of the primary driving axis and a right wall section of the frame structure.

In an embodiment of the invention, the snowmobile further comprises the electric motor located in the left-hand side of the snowmobile inside the frame structure so that the electric motor locates between a left end of the primary driving axis and a left wall section of the frame structure.

In an embodiment of the invention, the electric motor and the primary driving axis form an integrally singular element.

In an embodiment of the invention, the electric motor is configured to be attached to the primary driving axis with a conical connection with no backlash, or with a wedge axis connection or with a boron axis connection.

In an embodiment of the invention, the primary driving axis acts as supporting element for the electric motor through bearings.

In an embodiment of the invention, the electric motor is fixed directly to the frame structure.

In an embodiment of the invention, the electric motor is fixed to the frame structure via a connecting adapter.

In an embodiment of the invention, the connecting adapter comprises intrinsic flow channels for cooling air or liquid.

In an embodiment of the invention, the electric motor is supported either by the primary driving axis or the frame structure, or both.

In an embodiment of the invention, a wedge axis connection or a boron axis connection is used in aligning the primary driving axis with the rotational axis of the electric motor.

According to a second aspect of the invention, it discloses a first manufacturing method for a snowmobile with an electric motor, wherein the first manufacturing method comprises a step of configuring a transmission chain comprising a primary driving axis, a gear mechanism, a drive axle and an endless drive track, wherein the gear mechanism is configured between the primary driving axis and the drive axle, and wherein the drive axle is configured to rotate the endless drive track enabling movement of the snowmobile.

The first manufacturing method is characterized in that the first manufacturing method further comprises a step of configuring an electric motor into the snowmobile so that a rotating force of the electric motor is configured to apply directly or indirectly the primary driving axis.

In an embodiment of the first manufacturing method, the electric motor is configured along the primary driving axis so that the electric motor is placed on either end of the primary driving axis outside the frame structure of the snowmobile.

In an embodiment of the first manufacturing method, the electric motor is configured along the primary driving axis so that the electric motor is placed inside the frame structure of the snowmobile, and that the electric motor locates between an end of the primary driving axis and a corresponding closest wall section of the frame structure.

According to a third aspect of the invention, it discloses a second manufacturing method for a snowmobile with an electric motor. The second manufacturing method is characterized in that the second manufacturing method comprises the following steps:

removing from a combustion engine driven snowmobile the combustion engine, a driving pulley, a driven pulley and an endless drive belt; and configuring an electric motor into the snowmobile so that a rotating force of the electric motor is configured to apply directly or indirectly a primary driving axis of a combustion engine driven snowmobile, resulting in the snowmobile with the electric motor.

According to a fourth aspect of the invention, it discloses an electric motor element usable in a snowmobile. It is characterized in that the electric motor element comprises an electric motor, a connecting adapter fixed to the electric motor, bearings which are configured to be set as allowing rotating movement of a shaft to be connected using the rotational energy created by the electric motor, and internally built flow channels which are used for cooling of the electric motor.

In an embodiment of the fourth aspect, the electric motor element comprises integrally a primary driving axis acting as the shaft to be rotated.

DETAILED DESCRIPTION OF THE INVENTION

The present invention discloses an arrangement for attaching an electric motor with all needed parts into a snowmobile, and a finished snowmobile product which does not use any combustion engine anymore. In other words, the invention introduces a snowmobile with an electric motor. An alternative name of the invented vehicle is an electric sled. The present invention also covers the combination of an electric motor integrated with some parts of the traditional combustion engine transmission system of a snowmobile. In other words, the electric motor arrangement is designed to fit into a regular snowmobile frame by removing the combustion engine from the snowmobile frame, and reusing some of its parts in the transmission system of the electric snowmobile.

Now discussing electric motors in the context of the present invention, FIG. 1 illustrates a close-up of an electric motor 1 located in another end of a shaft. In the present invention, the connected shaft is a primary driving axis 3. An electric motor 1 is a cylinder shaped element which is aligned so that a round cross-sectional surface lies in a vertical direction. A connecting adapter 2 is a smaller round cross-sectional element placed on another vertical surface of the electric motor 1. The primary driving axis 3 is the horizontally aligned rod connected in the middle of the connecting adapter 2. Bearings 4 are placed around the rotating primary driving axis 3 in the connecting end of the shaft itself to the electric motor 1. Intrinsic flow channels 5 can be located within the connecting adapter 2 in order to allow fluid- or air-based cooling inside the electric motor 1. The flow channels 5 can be seen as holes on the outer surface of the cylinder-shaped connecting adapter 2. We discuss the connection principles of the electric motor 1 into the snowmobile in more detail later.

Figure 3:
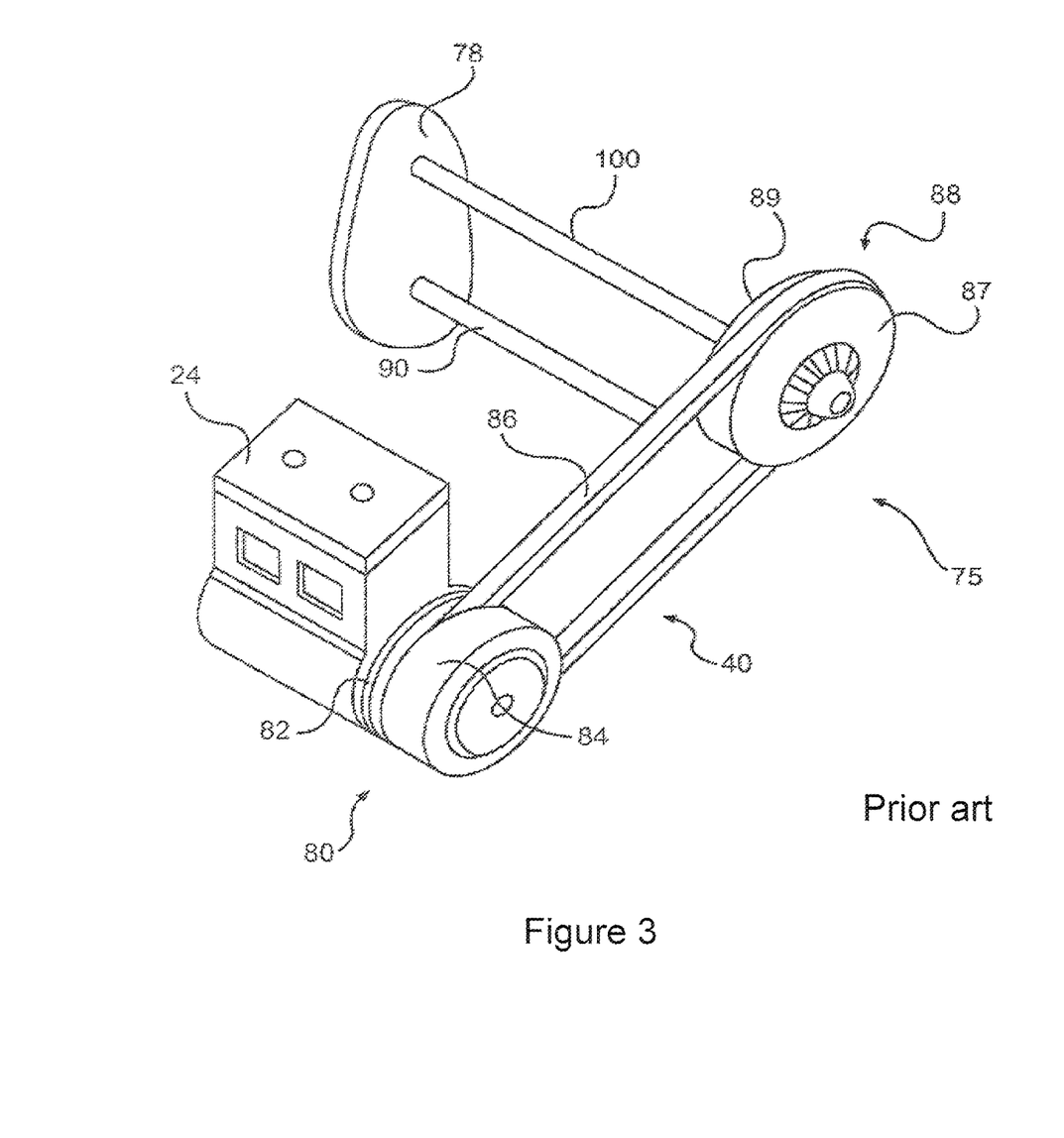
FIG. 3 illustrates the power transmission system of a snowmobile with a combustion engine according to prior art.

FIG. 2 illustrates a traditional snowmobile geometry as a side view according to prior art and FIG. 3 illustrates the power transmission of a combustion engine 24 used in the traditional snowmobile 10 also according to prior art. These figures are the same as FIGS. 1 and 2 in Bombardier 1. The combustion engine 24 in FIG. 2 is located below the steering bars inside the main frame, behind the front skis 26 and in front of the endless drive track 65 of the rear side of the vehicle. The rotational power created by the combustion engine 24 is converted to a movement of the endless drive track 65.

By referring to FIG. 3, a continuously variable transmission 40 ("CVT") system is shown there. The engine 24 output the rotational energy to a driving pulley 80. The driving pulley 80 in turn is connected to a driven pulley 88 via an endless drive belt 86 where belt drive sheaves are shown as 82, 84, 87, 89. The right-hand side pulley and the related sheaves 87, 89 can be called as a secondary variator. The driven pulley 88 is fixed to a jackshaft 100, which is transversely mounted, and which in turn is connected to an input member of a fixed ratio reduction drive 78. The output member of the reduction drive 78 is connected to a drive axle 90, i.e. a lower driving axle, which rotates the driving pulley 80 of the snowmobile. Due to horizontally created and frictional forces between the driving pulley 80 and the snowy ground, a forward driving force is created to the snowmobile 10, enabling its movement on the ground.

Now moving to a snowmobile applying energy created by an electric motor, FIGS. 4-7 illustrate the configuration of the electric motor 1 into the snowmobile in four different embodiments of the present invention which also depict the arrangement from different points of view.

The present invention is characterized in that the electric motor 1 is attached to another end of the primary driving axis 3, 100, in place of the secondary variator (shown as parts 87 and 89). In another embodiment of the invention, the electric motor 1 is placed along or in connection with the primary driving axis 3, 100. Such a connection may be a conical connection with no backlash but also some other types are possible, such as a wedge axis connection or a boron axis connection. All these three types of connections are well suitable for passing on the rotational energy obtained from the electric motor 1 but also for acting as supporting means for a rather heavy electric motor 1 through bearings 4.

As a result, the primary driving axis 3, 100 via the bearings 4 and the frame structure 5 of the snowmobile is then part of the supporting structure of the motor 1. Also the transmission elements locating after the primary driving axis 3, 100 can be reused as such without any further modifications. This is especially advantageous because there is no need for modifications in the elements 26, 16, 28, 65, 80 and 82 (=a rear suspension assembly) of the traditionally built snowmobile when converting it into an electrically driven snowmobile. Also the externally functioning functional components affecting the transmission system, such as the brake(s), can be left as unmodified.

Figure 4:
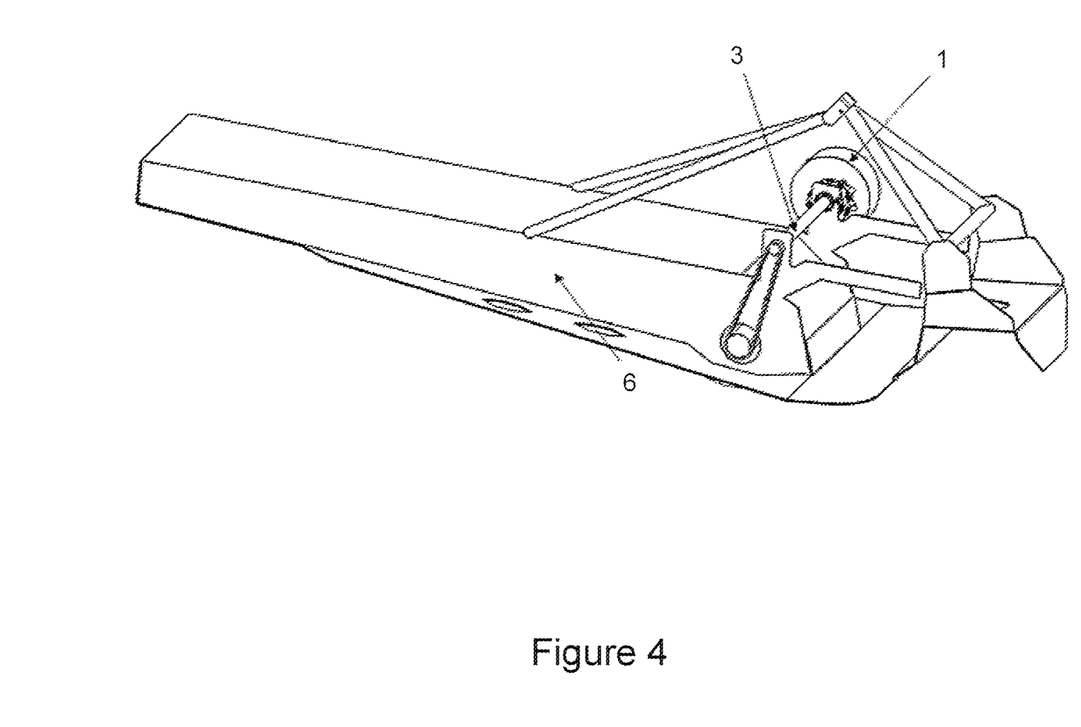
FIG. 4 illustrates the motor parts according to a first embodiment of the invented arrangement, outside the supporting structure on the left hand side of the main frame of the snowmobile.

In FIG. 4, the electric motor 1 can be seen in the rear side of the vehicle as a cylinder-shaped element. The electric motor 1 locates in the first embodiment outside the supporting frame structure 6 in the left-hand side of the snowmobile frame structure 6 (defined in view of the sitting position on the snowmobile seat). The primary driving axis 3 is connected to the electric motor 1 in the middle where the rotational axis of the electric motor 1 locates. The connection point goes through the supporting frame structure 6 through a hole. The belt, which is part of the gear mechanism (the reduction drive 78 in FIG. 3), can be seen on the right-hand side of the frame structure 6. Generally, the gear mechanism or the reduction drive 78 may be implemented in a form of a gear (=mechanism with toothed wheels), a belt or a chain.

Figure 5:
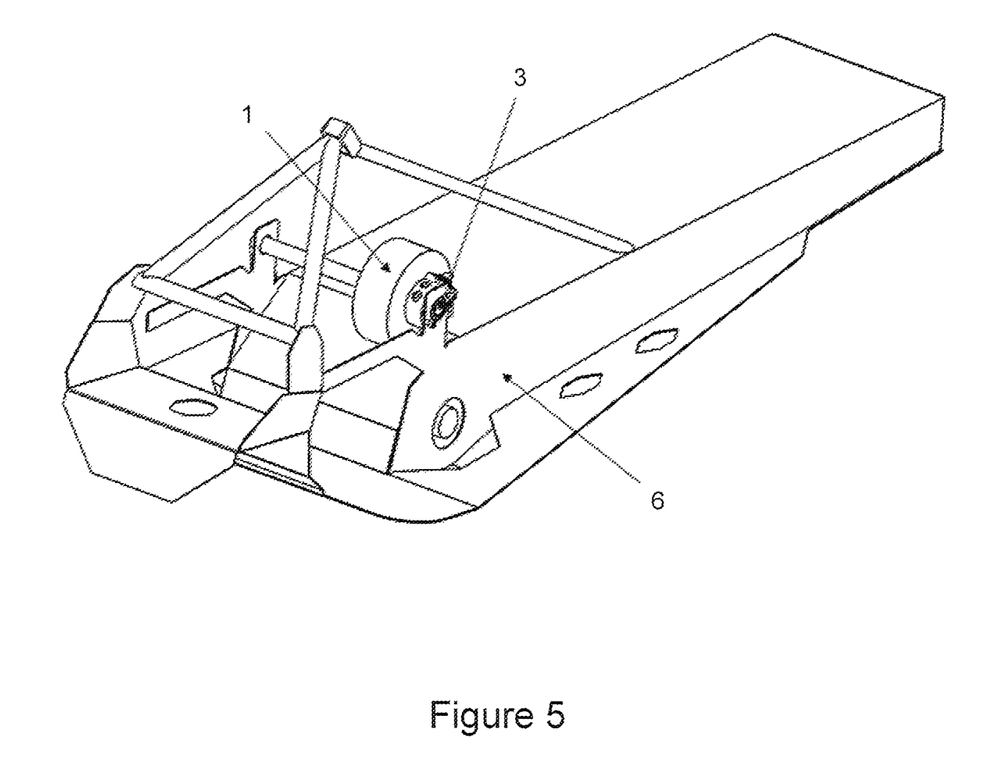
FIG. 5 illustrates the motor parts according to a second embodiment of the invented arrangement, inside the supporting structure on the left hand side of the main frame of the snowmobile.

FIG. 5 illustrates a second arrangement and embodiment of the invention, where the electric motor 1, the primary driving axis 3 and the frame structure 6 can be seen from a different viewing angle as well. In this embodiment, the electric motor 1 locates inside the supporting frame structure 6 and on the left-hand side along the primary driving axis 3 (defined in view of the sitting position on the snowmobile seat). Internally built flow channels can be seen there as well on top of the smaller cylindrical section on the electric motor 1 in order to enable cooling of the electric motor 1.

Figure 6:
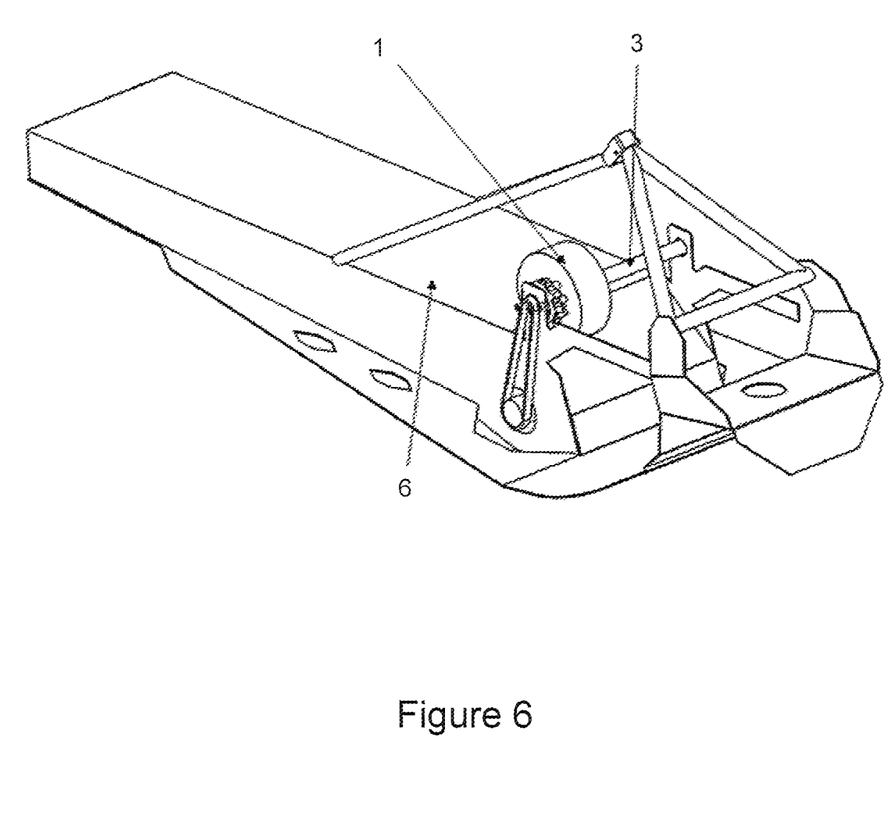
FIG. 6 illustrates the motor parts according to a third embodiment of the invented arrangement, inside the supporting structure on the right hand side of the main frame of the snowmobile.

FIG. 6 illustrates a third possible embodiment of the arrangement according to the invention. It also employs a new point of view for the arrangement. In the third embodiment, the electric motor 1 is configured to locate inside the supporting frame structure 6 and on the right-hand side along the primary driving axis 3. This time the electric motor 1 locates oppositely to the belt of the gear mechanism just across the frame wall. Similarly, as in the previous embodiments, the middle section of the electric motor 1 locates right along the axis line of the primary driving axis 3. The same main functional parts as in FIGS. 4-5 are visible also in the third embodiment.

Figure 7:
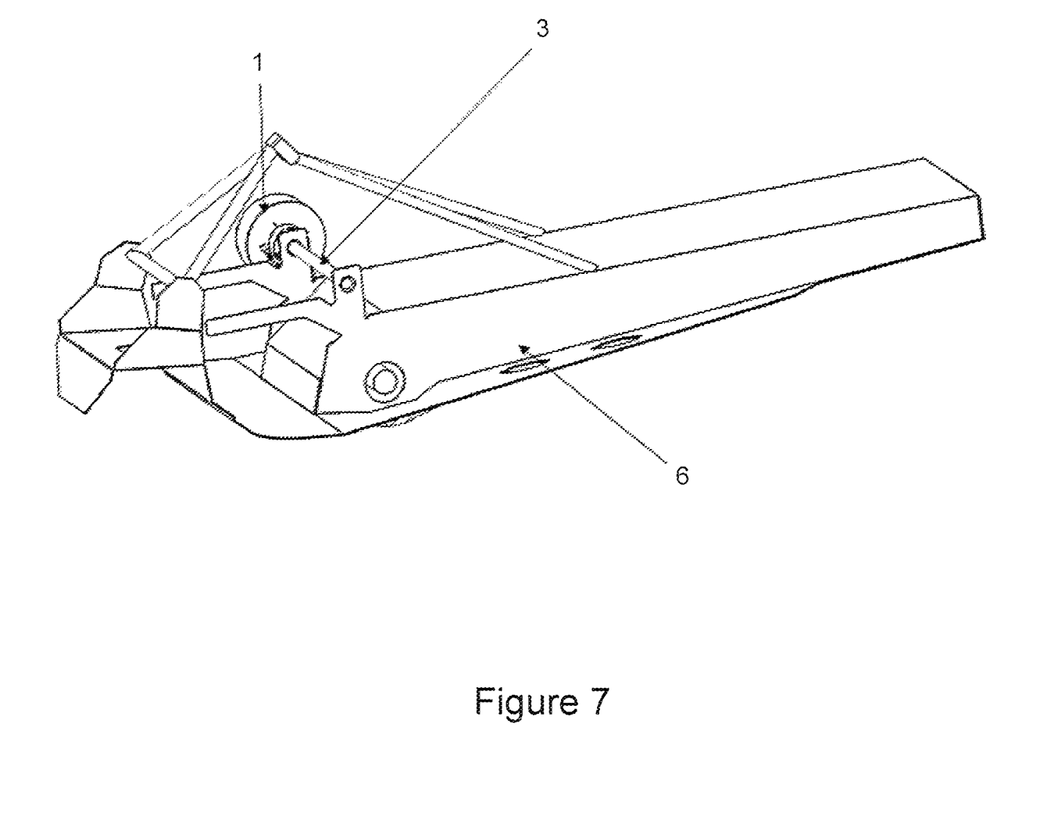
FIG. 7 illustrates the motor parts according to a fourth embodiment of the invented arrangement, outside the supporting structure on the right hand side of the main frame of the snowmobile.

Finally, FIG. 7 illustrates a fourth embodiment for the invention. This arrangement comprises the electric motor 1 locating just outside the frame structure 6 in the right-hand side of the frame. The electric motor 1 is connected to the end of the primary driving axis 3 principally the same way as in FIG. 4 in the first embodiment.

A common characteristic for all these four embodiments is that the electric motor 1 is configured to locate along the primary driving axis 3 at a selected location along the shaft, comprising also the ends of the shaft outside the main supporting frame structure 6 of the sled.

Next we discuss additional connection possibilities of the electric motor 1 to the frame structure 6 of the snowmobile or sled (see the embodiments of FIGS. 4-7). In one embodiment, the electric motor 1 is attached to the frame structure 6 without any separate intermediate means or connective element. In another embodiment, the connection is performed by a fixing adapter 2. The fixing adapter 2 may comprise internally built flow channels 5 which are used for liquid cooling of the electric motor 1. Whether the fixing of the electric motor 1 is fixed with the fixing adapter 2 or not, the power supplied by the electric motor 1 will transfer into rotation of the primary driving axis 3, 100, and from there on to the rest of the transmission chain into the rotational driving force of the endless drive track 65. In case the fixing adapter 2 has been used in securing the electric motor into its place, it acts as a further securing element as part of the supporting structure for the electric motor 1 in relation to the frame structure. In any case, the bearings 4 and also the connection between the electric motor 1 and the primary driving axis 3, 100 both act as supporting means for the electric motor 1.

In one embodiment, the supporting means for the electric motor 1 comprise just the primary driving axis 3, 100 via the bearings 4.

In another alternative embodiment, the supporting means for the electric motor 1 comprise just the frame structure 6 of the snowmobile.

As an alternative solution for the liquid cooling system of the electric motor 1, the cooling can be implemented as an air cooling system.

During the assemblance of the electric motor 1 into the snowmobile, when aligning the primary driving axis 3, 100 with the rotational axis of the electric motor, it can be performed by using a wedge axis connection or a boron axis connection in an embodiment of the invention.

Regarding the physical structure of the transmission chain, it is possible to integrate the electric motor 1 and its rotational axis together with the primary driving axis 3, 100 so that they all form a single physical element in one embodiment of the invention. In that case, when referring to FIG. 3, this is implemented by removing the combustion engine 24, the driving pulley 80, the driven pulley 88, the endless drive belt 86, and the jackshaft 100 from the traditional snowmobile, and these elements are replaced by a singular electrical power element comprising an electric motor 1 and the primary driving axis 3, 100 fixed to it.

The inventive idea also comprises a manufacturing method for a snowmobile with an electric motor. One option of manufacturing the electrically driven snowmobile is to start from a traditional combustion engine driven snowmobile and remove all parts between a driven pulley (88) and the combustion engine (24). In a given location along the primary driving axis (3, 100), the electric motor (1) can be attached centrally so that the rotational axis of the electric motor (1) will be fixed with primary driving axis (3, 100). The result is an electrically driven snowmobile which has been converted from a traditional combustion engine driven snowmobile. Another option of manufacturing the electrically driven snowmobile is to build a transmission chain from scratch, by configuring a primary driving axis (3, 100), a gear mechanism (76), a drive axle (90) and an endless drive track (65) in it, and by adding an electric motor (1) along the primary driving axis (3, 100) so that the rotational force is applied either directly or indirectly to the primary driving axis (3, 100), and further to the movement of the endless drive track (65).

The inventive idea also comprises an electric motor element, which can be used in assembling the electric snowmobile. The electric motor element comprises an electric motor (1), a connecting adapter (2) fixed to the electric motor (1), bearings (4) which are configured to be set as allowing rotating movement of a shaft to be connected using the rotational energy created by the electric motor (1), and internally built flow channels (5) which are used for cooling of the electric motor (1). In an embodiment, the electric motor element comprises integrally a primary driving axis (3, 100) acting as the shaft to be rotated. The electric motor element can be added into a traditional snowmobile where some of the parts relating to the combustion engine and its immediate transmission chain elements have been removed first.

The advantages of the present invention are various. In general, electrically driven snowmobiles will produce less noise to their surroundings while in use, and they do not pollute the natural environments where they are ridden, such as in national parks, forests, and around skiing centres. Thus, the driving action itself will be more pleasing to the snowmobile riders, and the nature experience will be more pleasing also for other people around them, such as skiers and other passers-by. Furthermore, the present invention has more ecological sense because it does not consume fossil fuels as regular combustion engines do. A main advantage is that it enables an easy manufacturing method for a future product in a form of an electrically driven snowmobile. The present invention forms a core part of the electric snowmobile, and therefore, it is an important part of the whole new type of vehicle. The present invention gives the possibility to convert the combustion engine driven snowmobile into electrically driven ones with a very little amount of changes, which makes it an easy, handy, quick and also cost-effective way of manufacturing electric sleds through updating the traditional sleds. Because the main structure of the traditional snowmobiles is very similar independently of the manufacturer and the model of the sled, the present invention is applicable to all snowmobiles and sleds with a traditional combustion engine. This makes the present invention especially multipurpose in this field of vehicles.

The present invention is not restricted merely into the embodiments presented above but they may vary within the scope of the claims.

The invention claimed is:

1. A snowmobile with an electric motor, the snowmobile comprising:
 a primary driving axis;
 a gear mechanism between the primary driving axis and a drive axle;
 the drive axle configured to rotate an endless drive track enabling movement of the snowmobile;
 an electric motor, having a rotating force configured to apply directly or in-directly the primary driving axis; and
 the electric motor is configured to be placed along or in connection with the primary driving axis, where the connection is a conical connection with no backlash, or a wedge axis connection;
 the electric motor is fixed to a frame by a connecting adapter; and
 the connecting adapter comprises intrinsic flow channels for cooling air or liquid.

2. The snowmobile according to claim 1, wherein the snowmobile further comprises the electric motor located in a right-hand side of the snowmobile outside the frame so that the connection of a rotation axis of the electric motor to the primary driving axis passes through a right side hole on the frame.

3. The snowmobile according to claim 1, wherein the snowmobile further comprises the electric motor located in a left-hand side of the snowmobile outside the frame so that the connection of a rotation axis of the electric motor to the primary driving axis passes through a left side hole on the frame.

4. The snowmobile according to claim 1, wherein the snowmobile further comprises the electric motor located in a right-hand side of the snowmobile inside the frame so that the electric motor locates between a right end of the primary driving axis and a right wall section of the frame.

5. The snowmobile according to claim 1, wherein the snowmobile further comprises the electric motor located in a left-hand side of the snowmobile inside the frame so that the electric motor locates between a left end of the primary driving axis and a left wall section of the frame.

6. The snowmobile according to claim 1, wherein the electric motor and the primary driving axis form an integrally singular element.

7. The snowmobile according to claim 1, wherein the primary driving axis acts as supporting element for the electric motor through bearings.

8. The snowmobile according to claim 1, wherein the electric motor is supported either by the primary driving axis or the frame, or both.

9. A manufacturing method for a snowmobile with an electric motor, wherein the manufacturing method comprises a step of:
- configuring a transmission chain comprising a primary driving axis, a gear mechanism, a drive axle and an endless drive track, wherein the gear mechanism is configured between the primary driving axis and the drive axle, and wherein the drive axle is configured to rotate the endless drive track enabling movement of the snowmobile;

wherein the manufacturing method further comprises the steps of:
- configuring an electric motor into the snowmobile so that a rotating force of the electric motor is configured to apply directly or indirectly the primary driving axis; and
- placing the electric motor along or in connection with the primary driving axis, where the connection is a conical connection with no backlash, or a wedge axis connection;
- fixing the electric motor to a frame by a connecting adapter, wherein the connecting adapter comprises intrinsic flow channels for cooling air or liquid.

10. The manufacturing method according to claim 9, wherein the electric motor is configured along the primary driving axis so that the electric motor is placed on either end of the primary driving axis outside the frame of the snowmobile.

11. The manufacturing method according to claim 9, wherein the electric motor is configured along the primary driving axis so that the electric motor is placed inside the frame of the snowmobile, and that the electric motor locates between an end of the primary driving axis and a corresponding closest wall section of the frame.

12. A manufacturing method for a snowmobile with an electric motor, wherein the manufacturing method comprises the following steps:
- removing from a combustion engine driven snowmobile the combustion engine, a driving pulley, a driven pulley and an endless drive belt;
- configuring an electric motor into the snowmobile so that a rotating force of the electric motor is configured to apply directly or indirectly a primary driving axis of a combustion engine driven snowmobile; and
- placing the electric motor along or in connection with the primary driving axis, where the connection is a conical connection with no backlash, or a wedge axis connection;
- fixing the electric motor to a frame by a connecting adapter, wherein the connecting adapter comprises intrinsic flow channels for cooling air or fluid, resulting in the snowmobile with the electric motor.

\* \* \* \* \*